United States Patent [19]

Akai et al.

[11] 4,366,208

[45] Dec. 28, 1982

[54] PROCESS FOR FORMING PHOTOCONDUCTIVE ORGANIC FILM

[75] Inventors: Yoshimi Akai; Masahiko Hirose, both of Yokohama; Hideo Sanpei, Hiratsuka, all of Japan

[73] Assignee: Tokyo Shibaura Denki Kabushiki Kaisha, Kawasaki, Japan

[21] Appl. No.: 199,664

[22] Filed: Oct. 22, 1980

[30] Foreign Application Priority Data

Oct. 23, 1979 [JP] Japan ................................. 54-135937

[51] Int. Cl.³ .............................................. B05D 5/12
[52] U.S. Cl. .................................... 428/421; 204/169; 427/41; 428/442; 428/500
[58] Field of Search ............................ 427/39, 40, 41; 204/165, 168, 169; 428/421, 442, 500

[56] References Cited

U.S. PATENT DOCUMENTS 3,318,790  5/1967  Carbajal et al. ...................... 204/168
3,518,108  6/1970  Heiss, Jr. et al. .
4,091,166  5/1978  Kubacki ................................ 427/41
4,252,848  2/1981  Datta et al. ......................... 428/163

FOREIGN PATENT DOCUMENTS 2557899  3/1977  Fed. Rep. of Germany ........ 427/41

OTHER PUBLICATIONS

S. Morita et al., *Journal of Polymer Science,* vol. 15, 981–986 (1977).

*Primary Examiner*—John H. Newsome
*Attorney, Agent, or Firm*—Schwartz, Jeffery, Schwaab, Mack, Blumenthal & Koch

[57] ABSTRACT

A process for forming a photoconductive organic film on a substrate by the plasma polymerization reaction of a mixture of an organic compound vapor and a carrier gas activated in a plasma producing region, comprises carrying out the plasma polymerization reaction in the presence of a halogen compound vapor.

6 Claims, 1 Drawing Figure

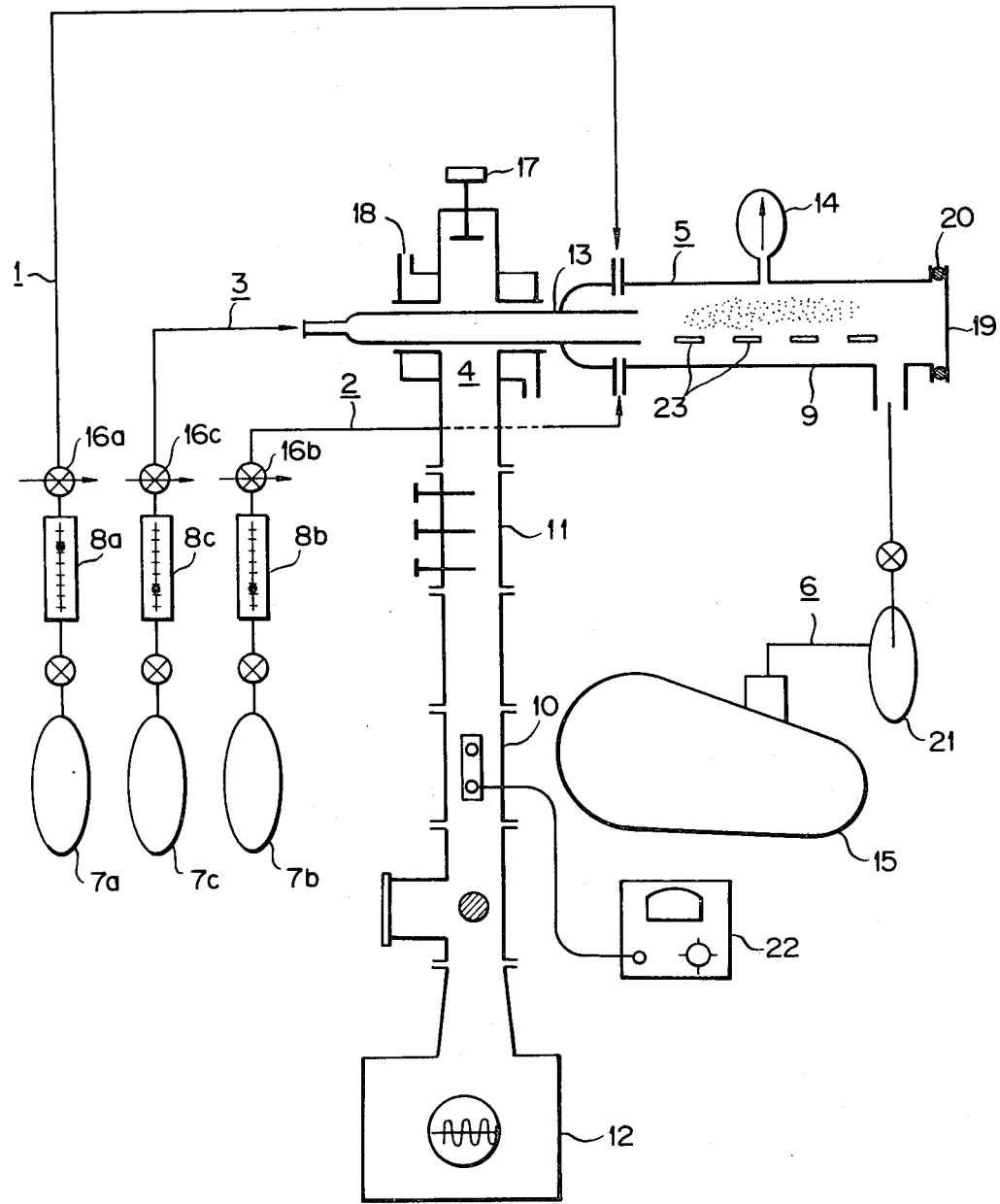

PROCESS FOR FORMING PHOTOCONDUCTIVE ORGANIC FILM

This invention relates to a process for forming a photoconductive organic film, and more particularly relates to an improvement in the process for forming a photoconductive organic film on a substrate by glow discharge (plasma) polymerization reaction of an organic compound vapor.

In a prior art the photoconductive organic film is prepared by coating on a surface of a certain substrate a solution containing a compound such as a polynuclear aromatic compound, e.g., anthracene, carbazole, anthraquinone or perylene, a low molecular weight heterocyclic compound, e.g., a triphenylpyrazoline derivative or an oxydiazole derivative, or polycarbazole, and then drying the so coated material. A photoconductive organic film prepared in the above-stated process has such advantageous aspects as having an appropriate flexibility and being easily cut. Nevertheless, the above-described solution-coating process also has the following disadvantageous aspects:

(a) an extremely thin film can hardly be prepared;
(b) uniformity of the film is not satisfactory;
(c) the thickness of the film can hardly be controlled;
(d) the prepared film is comparatively costly;
(e) adhesion with the substrate is not satisfactory;
(f) pinholes likely remain in the prepared film; and
(g) formation of the satisfactory film on a complicatedly shaped surface can hardly be done.

In addition to the above-listed disadvantages, the film prepared in the process has another drawback in that it is poorly sensitive to a light in the near infrared region (1-3 $\mu$m) because the sensible region of the film corresponds to a wavelength of lower than 0.8 $\mu$m.

Since an organic compound is easily processed, a photoconductive organic film can be utilized as a small sized element for, for instance, a photo-detector to be employed in the photo-communication system, or a photosensor sensing the near infrared light if the organic film can be made to show high photoconductivity in the near infrared region. For this reason, improvements of the photoconductivity of the organic film have been awaited.

The present inventors had established an art for overcoming the above-described disadvantageous aspects and drawback residing in the prior arts and the so established art was applied for Japanese patent; that is, a process for the formation of a photoconductive organic film showing the photoconductivity in the near infrared region which comprises the glow discharge polymerization reaction of an organic compound vapor as disclosed in Japanese Patent Provisional Publication No. 86169/1980. More in detail, this prior art process is performed by employing an apparatus comprising an organic compound (starting material) vapor supplying system, a carrier gas (gas to be converted to a plasma) supplying system, a plasma producing system, a plasma polymerization reaction system and an exhaust system. Based on this art, the present inventors have further made intensive studies for the purpose of more increase of the photoconductivity and found that a photoconductive organic film showing the photoconductivity more than ten times as much as an organic film prepared according to the previously established art can be prepared by incorporating a gaseous halogen compound into the plasma polymerization system. The present invention has been completed upon this finding.

"Photoconductivity in Thin Organic Films" reported by A. Bradley and J. P. Hammes in Journal of the Electrochemical Society, vol. 110, pp. 543–548 (1963) discloses the formation of polymerized films by means of the plasma polymerizations (glow discharge of alternating current is employed) of a variety of vapors of organic compounds. However, it neither mentions nor infers the use of a halogen compound. This study further describes the determination of the photoconductivity of the so prepared polymerized film. There is no mention of the wavelength region of the photosensitivity, but the region is supposed to be the visible region.

It is, accordingly, a principal object of the invention to provide a process for forming a photoconductive organic film having a prominently high sensitivity in the near infrared region as compared with the prior art films, which comprises subjecting a mixture of a halogen compound vapor with the starting organic compound vapor to the plasma polymerization.

According to the present invention, an organic compound vapor serving as the starting compound and a halogen compound vapor to be mixed with the organic compound vapor are individually introduced into the polymerization reaction region through separate routes and these compounds are then mixed with a carrier gas previously activated in the plasma producing region by discharging to undergo the polymerization. Thus, the photoconductive organic film is formed on a substrate which has been placed in the reaction vessel in advance of the polymerization.

Examples of the starting organic compounds include acetylene, ethylene, vinylidene fluoride, styrene, propylene, vinyl ether, vinyl alcohol, vinyl chloride, vinylidene chloride, vinyl acetylene, and butene. Particularly preferred are acetylene, ethylene and vinylidene fluoride.

Examples of the halogen compounds include methylene bromide, carbon tetrafluoride, carbon tetrachloride, ethyl chloride, ethylene chloride, ethyl bromide, ethylene bromide, vinyl bormide, methyl bromide, propylene bromide, allyl fluoride, ethyl fluoride, propyl fluoride, methyl fluoride, ethyl iodide, ethylene iodide, vinyl iodide, methyl iodide, methylene iodide, hydrogen bromide and hydrogen iodide. Particularly preferred are methylene bromide and carbon tetrafluoride.

Examples of the substrates include quartz, calcium fluoride crystal, a crystal of mixture of thallium iodide and bromine iodide, a crystal of mixture of thallium chloride and thallium iodide and borosillicate glass.

Examples of the carrier gases include argon, nitrogen, hydrogen and helium.

The plasma polymerization reaction of this invention is generally carried out for 10–60 min. In the examples set forth hereinafter the description will be given with reference to embodiments in which the polymerization reactions are carried out in a region separated from the plasma producing region, but the polymerization reaction can be carried out even in the plasma producing region.

The present invention is now described more in detail, by referring to the attached drawing, the sole FIGURE of which illustrates an example of the apparatus to be employed in carrying out the process of the present invention.

In the FIGURE, the apparatus comprises an organic compound vapor supplying system 1, a halogen compound vapor supplying system 2, a carrier gas (gas to be converted to a plasma) supplying system 3, a plasma producing system 4, a plasma polymerization reaction system 5, and an exhaust system 6. The starting material supplying system 1 is provided with an organic compound vapor storage tank 7a and a flowmeter 8a and has a structure in which the starting material vapor is supplied to a plasma polymerization reaction vessel 9 made of quartz. The halogen compound vapor supplying system 2 is likewise provided with a vapor storage tank 7b and a flowmeter 8b and it supplies the vapor to the plasma polymerization reaction vessel 9. The carrier gas (gas to be converted to a plasma) supplying system 3 is provided with a gas storage tank 7c and a flowmeter 8c and has a structure in which the gas to be converted to a plasma is supplied to the plasma producing system 4.

The plasma producing system 4 is provided with a directional connecting tube 10, a three stab tuner 11, a magnetron oscillator 12 and a plasma producing region or tube 13. The plasma producing region 13 is connected to the plasma polymerization vessel 9 at its one end.

The plasma polymerization reaction vessel 9 is the main part of the plasma polymerization reaction system 5 and is provided with a capacitance manometer 14. The reaction vessel 9 is further connected to the exhaust system 6 equipped with an oil rotary pump 15 so as to draw the gas and vapor off the reaction vessel 9. In the FIGURE, 16a, 16b and 16c designate needle valves, and 17 and 18 designate a plunger and a water cooling tube, respectively. Further, 19 designates a covering plate attached to the reaction vessel 9 through an O ring 20, and 21 and 22 designate a trap for the exhaust system and a microwave wattmeter, respectively.

In an operation of the apparatus having the above-described constitution, the oil rotary pump 15 is, in the first place, activated to evacuate the plasma polymerization reaction vessel 9 so that the pressure within the reaction vessel 9 can reach a level of lower than $10^{-3}$ Torr. Then, a carrier gas such as argon, nitrogen, hydrogen or helium is supplied from the storage tank 7c to the side of the plasma producing region 13 via the flowmeter 8c and the needle valve 16c. In this operation, the oil rotary pump 15 is continued to work so as to maintain the pressure within the reaction vessel 9 at a level of 1–3 Torr. and thus the carrier gas is introduced, at the rate of approximately 100–300 cc/min., into the plasma producing region 13 in which the carrier gas is turned into a plasma gas. The regulations of the pressure and gas flow rate are carried out, at an appropriate time, by means of the flowmeter 8c, the needle valve 16c and the capacitance manometer 14.

Subsequently, the magnetron oscillator 12 is operated for oscillating a microwave of, for instance, the frequency of 2,450 MHz and the maximum power of 800 W. The so produced microwave is subjected to impedance matching by means of the three stab tuner 11 and the plunger 17, and transmitted into the plasma producing region 13. Thus, the aforementioned carrier gas is discharged.

After the plasma is stabilized, the organic compound vapor is supplied from the storage tank 7a to the reaction vessel 9 via the flowmeter 8a and the needle valve 16a at a flow rate of, for instance, 1–10 cc/min. under a pressure of $10^{-1}$–$10^{-2}$ Torr. In addition, the halogen compound vapor is supplied from the storage tank 7b to the reaction vessel 9 via the flowmeter 8b and the needle valve 16b at a flow rate of, for instance, 0.5–10 cc/min. under $10^{-1}$–$5 \times 10^{-3}$ Torr. Both vapors are then mixed with the carrier gas which has been activated in the course of passing through the aforementioned plasma producing region 13 so that the polymerization reaction takes place. Thus, the plasma-polymerized product is deposited on a surface of a substrate 23 such as a quartz plate which has been placed within the reaction vessel 9 in advance, so that a photoconductive organic film is formed on the plate. According to these procedures, there can be given a photoconductive organic film of the thickness 0.5–5 μm, as desired, which is uniformly formed and of a smooth surface.

The photoconductive organic film prepared following the above-described procedures has a number of advantageous characteristics set forth below:

(1) The film has a high sensitivity in the near infrared region, that is, a sensitivity higher by 10–60 dB than the sensitivity given by an organic film containing no halogen compound.
(2) An extremely thin film, namely a thickness of lower than hundreds Angstrom, can be obtained.
(3) The film having the above-mentioned advantages can be formed even on a substrate of complicated shape.
(4) The adhesion with the substrate is improved.
(5) The rate of the polymerization reaction for the formation of film is increased.

The present invention is further illustrated by the following examples and comparative examples, but these examples are not provided to restrict the invention.

EXAMPLES AND COMPARATIVE EXAMPLES

A photoconductive organic film of a thickness 1.8–3.1 μm was prepared under the following conditions.

(1) Carrier gas:
argon supplied at the flow rate of 300 cc/min. under the pressure of 3 Torr.
(2) Organic compound vapor:
vapor of acetylene (A), ethylene (B), vinylidene fluoride (C), or styrene (D) supplied at the flow rate of 6 cc/min. under the pressure of 0.06 Torr.
(3) Halogen compound vapor:
methylene bromide or freon ($CF_4$) supplied at the flow rate of 3 cc/min. under the pressure of 0.03 Torr.
(4) Power of microwave:
465–480 W
(5) Time of plasma polymerization reaction:
10–20 min.

A sandwich cell was prepared using the so obtained photoconductive organic film and exposed to a halogen lamp. The so determined sensitivity is set forth in Table 1.

As seen from Table 1, the film prepared by incorporating a halogen compound showed a sensitivity of higher by 10–60 dB than the film with no halogen compound.

All of the photoconductive organic films set forth in Table 1 were exposed to the following light sources to determine the photoelectric currents:
(a) Light source radiating a visible light of wavelength of lower than 0.8 μm.
(b) Light source radiating a near infrared light in the range of wavelength 0.8–3.0 μm.
(c) Light source radiating an infrared light of wavelength of higher than 3.0 μm.

The so determined photoelectric currents are as follows:

Where the value given by the light source (b) is expressed as 1, the relative values are approximately 0.02 for the radiation of light source (a) and approximately 0.05 and a dark current of approximately 0.01 for the radiation of light source (c). Accordingly, a prominently excellent sensitivity was given at wavelength in the near infrared region, namely, under the condition (b).

TABLE 1

| | Organic Compound | Halogen Compound | Power of Microwave (W) | Reaction Time (min.) | Thickness of Formed Film (μm) | Sensitivity (dB) |
|---|---|---|---|---|---|---|
| A-1 | Acetylene | None | 480 | 20 | 2.8 | 16 |
| A-2 | " | Methylene bromide | 475 | 10 | 2.7 | 78 |
| A-3 | " | Freone | 480 | 20 | 1.8 | 60 |
| B-1 | Ethylene | None | 465 | 30 | 1.2 | 41 |
| B-2 | " | Methylene bromide | 470 | 10 | 3.1 | 62 |
| B-3 | " | Freone | 470 | 20 | 2.2 | 58 |
| C-1 | Vinylidene Fluoride | None | 475 | 30 | 2.1 | 38 |
| C-2 | Vinylidene Fluoride | Methylene bromide | 465 | 10 | 2.6 | 64 |
| C-3 | Vinylidene Fluoride | Freone | 470 | 20 | 2.1 | 56 |
| D | Styrene | None | 480 | 30 | 2.6 | 32 |

We claim:

1. A process for forming a photoconductive organic film on a substrate by the plasma polymerization reaction, comprising the steps of:
    activating a carrier gas in a microwave plasma producing region;
    introducing an organic compound vapor and a halogen compound vapor directly individually into a polymerization reaction region; and
    introducing said activated carrier gas into said polymerization reaction region, thereby carrying out the plasma polymerization reaction in a region separated from said microwave plasma introducing region in the presence of said halogen compound vapor to form on the substrate a photoconductive organic film having a photoconductivity in the near infrared region of from 0.8 to 3.0 μm.

2. An article of manufacture, comprising a substrate and a photoconductive organic film on the substrate, wherein said film is applied according to the process of claim 1.

3. A process as claimed in claim 1, in which the organic compound is selected from the group consisting of acetylene, ethylene, vinylidene fluoride, styrene, propylene, vinyl ether, vinyl alcohol, vinyl chloride, vinylidene chloride, vinyl acetylene and butene.

4. A process as claimed in claim 3, in which the organic compound is acetylene, ethylene or vinylidene fluoride.

5. A process as claimed in claim 1, in which the halogen compound is selected from the group consisting of methylene bromide, carbon tetrafluoride, carbon tetrachloride, ethyl chloride, ethylene chloride, ethyl bromide, ethylene bromide, vinyl bromide, methyl bromide, propylene bromide, allyl fluoride, ethyl fluoride, propyl fluoride, methyl fluoride, ethyl iodide, ethylene iodide, vinyl iodide, methyl iodide, methylene iodide, hydrogen bromide and hydrogen iodide.

6. A process as claimed in claim 5, in which the halogen compound is methylene bromide or carbon tetrafluoride.

* * * * *